No. 12,716. REISSUED NOV. 5, 1907.

C. E. JOHNSON.

PADLOCK.

APPLICATION FILED SEPT. 25, 1907.

Witnesses:
F. W. Dannenfelser
Langdon Morris

Inventor:
C. E. Johnson
by
Barnes, Brownell & Mulholland
Attorneys.

THE NORRIS PETERS CO., WASHINGTON, D. C.

UNITED STATES PATENT OFFICE.

CHARLES E. JOHNSON, OF NEW BRITAIN, CONNECTICUT, ASSIGNOR TO CORBIN CABINET LOCK COMPANY, OF NEW BRITAIN, CONNECTICUT, A CORPORATION OF CONNECTICUT.

PADLOCK.

No. 12,716. Specification of Reissued Letters Patent. Reissued Nov. 5, 1907.

Original No. 864,743, dated August 27, 1907, Serial No. 370,133. Application for reissue filed September 25, 1907. Serial No. 394,440½.

*To all whom it may concern:*

Be it known that I, CHARLES E. JOHNSON, a citizen of the United States, residing at New Britain, Hartford county, Connecticut, have invented certain new and useful Improvements in Padlocks, of which the following is a full, clear, and exact description.

My invention relates to pad-locks and consists in improvement in the construction thereof.

Figure 1:
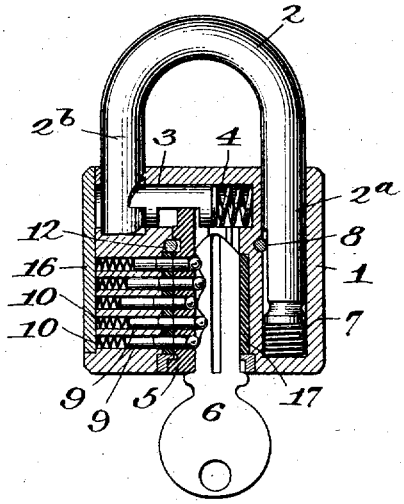
Figure 4:
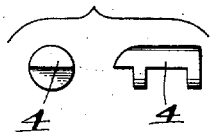
Figure 6:
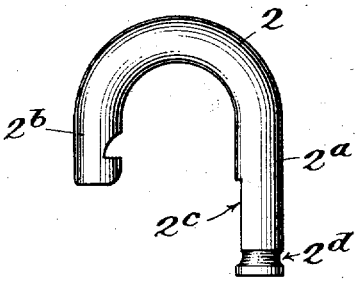
Figure 5:
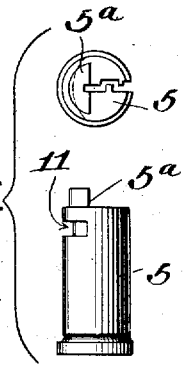
Figure 2:
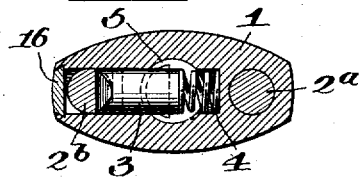
Figure 7:
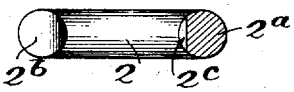
Figure 3:
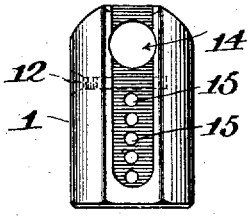
Figure 8:
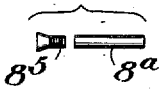

In the drawings—Figure 1 is a vertical section through the case, certain parts being shown in elevation; Fig. 2 is a cross section taken through the upper part of the pad-lock; Fig. 3 is an edge elevation of the case with all of the operating parts removed; Fig. 4 is illustrative of the locking-bolt; Fig. 5 is illustrative of the bolt-operating member; Fig. 6 is a side elevation of the hasp detached; Fig. 7 is a view of the hasp from the under side, the same being partly in section; Fig. 8 illustrates a retaining pin.

The pad-lock to which this invention relates is of the sliding hasp variety. The case or frame is made of a solid block of metal, being formed preferably by the so-called "extruding" process, which process affords a shape of any desired cross section. The preferable cross sectional shape of this case corresponds to that indicated in Fig. 2. This solid block is bored into at various places and at different angles, as hereinafter described, for the purpose of permitting the various operating parts to be assembled therewith.

In the drawings, 1 represents the pad-lock case or body.

2 represents the shackle or hasp, which is U-shaped, one end thereof being longer than the other. The upper end of the case 1 is bored into to receive the ends of said hasp, the boring at one side being considerably deeper than at the other side, so as to afford a proper bearing support for the longer end $2^a$ of said hasp. The shorter end $2^b$ is notched to receive the locking end of a sliding locking-bolt 3. This bolt reciprocates in a hole bored into one edge of the case 1 at right-angles to the first-mentioned openings. Within this transverse opening and to the rear of the bolt 3 is a spring 4, preferably of the coil type, the same being held in place by the wall of the bore in which it stands.

5 is the bolt-operating device, which comprises a rotatable hub or plug actuated by a key 6, and located in a bore in the under side of the case parallel with and between the hasp openings. The upper end of this hub or plug 5 is provided with a cam $5^a$, which engages a shoulder portion of the bolt 3, so that when said plug is turned, the cam $5^a$ will retract the bolt 3, freeing the end $2^b$ of the hasp, at which moment said hasp will be forced outwardly under the influence of a spring 7 located underneath the longer end $2^a$ of the hasp.

8 is a pin located in a cross-bore in the lock-case 1, a portion of the pin standing in a longitudinal groove $2^c$ in the side of the long end $2^a$ of the hasp. An annular groove $2^d$ in the end $2^a$ intersects the longitudinal groove $2^c$.

To lock the bolt-operating device against rotation, I provide the usual pin tumblers 9—9 inserted in borings parallel with the bore which receives the bolt 3 and opening at the same side of the lock-case 1.

10—10 are the usual tumbler springs.

11 is a semi-annular groove in the side of the plug 5.

12 is a pin located in a suitable cross boring in the lock-case 1, a portion of said pin projecting slightly into said semi-annular groove to prevent the accidental detachment of the plug, at the same time permitting of sufficient rotation thereof to retract latch 3.

The ends of the borings for the bolt 3 and pin tumblers 9 are seen in Fig. 3, and are indicated respectively by numerals 14 and 15—15.

16 is a dove-tailed cover-plate which slides in an under-cut recess in that edge of the lock-case 1 in which the borings 14—15 are made. When all the lock parts are assembled, the cover-plate 16 is slid into place and the overhanging edges at the edge of the recess are swedged down so as to make a permanent joint.

I have found that by this construction and arrangement a most strong and durable lock can be produced in a very economical and expeditious manner. The solidity of the case 1 prevents the breaking of the lock, save by a most extraordinary effort. The line of demarcation between the slide and the body 1, as well as the line around the pins 8—12 can be entirely eliminated by burnishing the surface, in fact, these lines are so completely hidden that it is impossible, from an inspection of the lock, to ascertain or determine what the interior arrangement or construction is.

In the drawings I have indicated that the pin-tumbler lock is of the master-key variety, there being a rotatable shell 17 around the plug 5, the pins being properly divided and arranged to permit the use of the usual master-key operation, which is so well known as to avoid the necessity of specific description.

All of the springs employed are preferably of the "coil" variety, and they are respectively supported and alined by the walls of the bores in which they stand. These springs, therefore, are in each event of slightly smaller diameter than the diameter of the parts which they operate respectively.

To dismember the lock, the bolt 3 would first be retracted by the key 6, whereupon if pin 8 were driven out, the hasp 2 and spring 7 could be removed. Upon removing slide 16, the springs 10 and tumblers 9 could be removed. By then removing pin 12, the plug 5 could be removed, which would free the bolt 3 as well as spring 4. While it is never intended to dismember the lock, this description will enable the reader to understand that it requires but a mere reversal of the steps referred to, to assemble the same.

The preferable construction of the retaining pins 8 and 12 is shown in Fig. 8, in which it is seen that the pin is made in two parts, $8^a$ and $8^b$, the former being smooth sided, the latter being screw-threaded and provided with a beveled head. The part $8^a$ is first inserted and then the part $8^b$ is screwed into place behind it. When the latter part is screwed home the outer end of the head is swedged down and finished off. This makes a very secure attachment, prevents all danger of buckle, and avoids the necessity of so accurately proportioning the pin as required for a driving fit. When the hasp is unlocked it may be turned freely by reason of groove $2^d$.

What I claim is—

1. In a pad-lock a solid body or case, two parallel bores extending into the top of the same, one of said bores being deeper than the other and extending nearly through the case, a third bore parallel to the others but extending into the case from the lower end and between the first two, two or more bores extending into one side edge of the case, and including a relatively large bore and relatively small bore, the former intersecting the shorter of the upper bores, the latter intersecting the lower bore.

2. In a pad-lock, a solid body or case, three parallel bores extending longitudinally thereof, two of the same entering the case from above, the third entering from below, two or more transverse bores entering the case from the same side and in substantially the same plane and at right-angles to the first-mentioned bores, one of said bores being of relatively large caliber, and means to close the open ends of said side bores.

3. In a pad-lock, a solid case, three parallel bores extending longitudinally thereof, two of said bores entering from above, the third from below, a hasp in the first two, a rotatable bolt-operating device in the third, key-operated means for locking and unlocking the latter, transverse bores in said case, one of the latter being of relatively large diameter, a locking-bolt therein coöperating with the hasp, said key-operated means standing in said smaller bores, and means to close the outer ends of all of said side bores.

4. In a pad-lock, a solid case, three parallel bores extending longitudinally thereof, two of said bores entering from above, the third from below, a hasp in the first two, a rotatable bolt-operating device in the third, key-operated means for locking and unlocking the latter, transverse bores in said case, one of the same being of relatively large diameter, a locking-bolt therein coöperating with said hasp, means to close the outer ends of said side bores, and means to prevent the removal of said hasp and plug from said case.

5. In a pad-lock, a solid case, a sliding hasp carried thereby, a bolt carried thereby, a rotatable bolt-operating plug carried thereby, key-operated means for locking and unlocking said rotatable plug, and including a pin movable laterally of said plug, all of said members being mounted and operating in openings of circular cross section.

6. In a pad-lock, a solid case, a sliding hasp carried thereby, a bolt carried thereby, a rotatable bolt-operating plug carried thereby, key-operated means for locking and unlocking said rotatable plug, and including a pin movable laterally of said plug, all of said members being mounted and operating in openings of circular cross section, and means for preventing the removal of said hasp and said plug.

7. In a pad-lock, a solid case, a sliding hasp carried thereby, a bolt carried thereby, a rotatable bolt-operating plug carried thereby, key-operated means for locking and unlocking said rotatable plug, and including a pin movable laterally of said plug, all of said members being mounted and operating in openings of circular cross section, means for preventing the removal of said hasp and said plug, and means including the hasp to close all of said openings.

8. In a pad-lock, a solid case, two parallel bores entering into the top of the same, one of said bores being deeper than the other, a third bore parallel with the first two, but entering the case from the lower end and in a plane between the first two, a fourth bore entering the case at one side edge and intersecting the shorter of the first two mentioned bores, a fifth bore of smaller diameter than the others entering the case from the same edge as the fourth bore, but of smaller diameter, a hasp adapted to the first two bores, a key-plug adapted to the third bore, a spring-pressed bolt adapted to the fourth bore, a spring-pressed pin adapted to the fifth bore, means for closing in said fourth and fifth bores, and means for holding said hasp and plug against accidental detachment.

9. In a pad-lock, a solid body, a hasp, a bolt, a key-rotatable plug, locking means therefor, a locking pin for said plug, all of said parts being contained in bores of circular cross section, and a single means for covering the bores for the bolt and locking pin.

10. In a pad-lock, a solid body, a hasp, a bolt, a key-rotatable plug, locking means therefor, a locking pin for said plug, all of said parts being contained in bores of circular cross section, and a single means for covering the bores for the bolt and locking pin, said means comprising a plate making a dove-tail connection with said solid body.

CHARLES E. JOHNSON.

Witnesses:
W. H. Booth,
John D. Blair.